_United States Patent Office_ 2,810,256
Patented Oct. 22, 1957

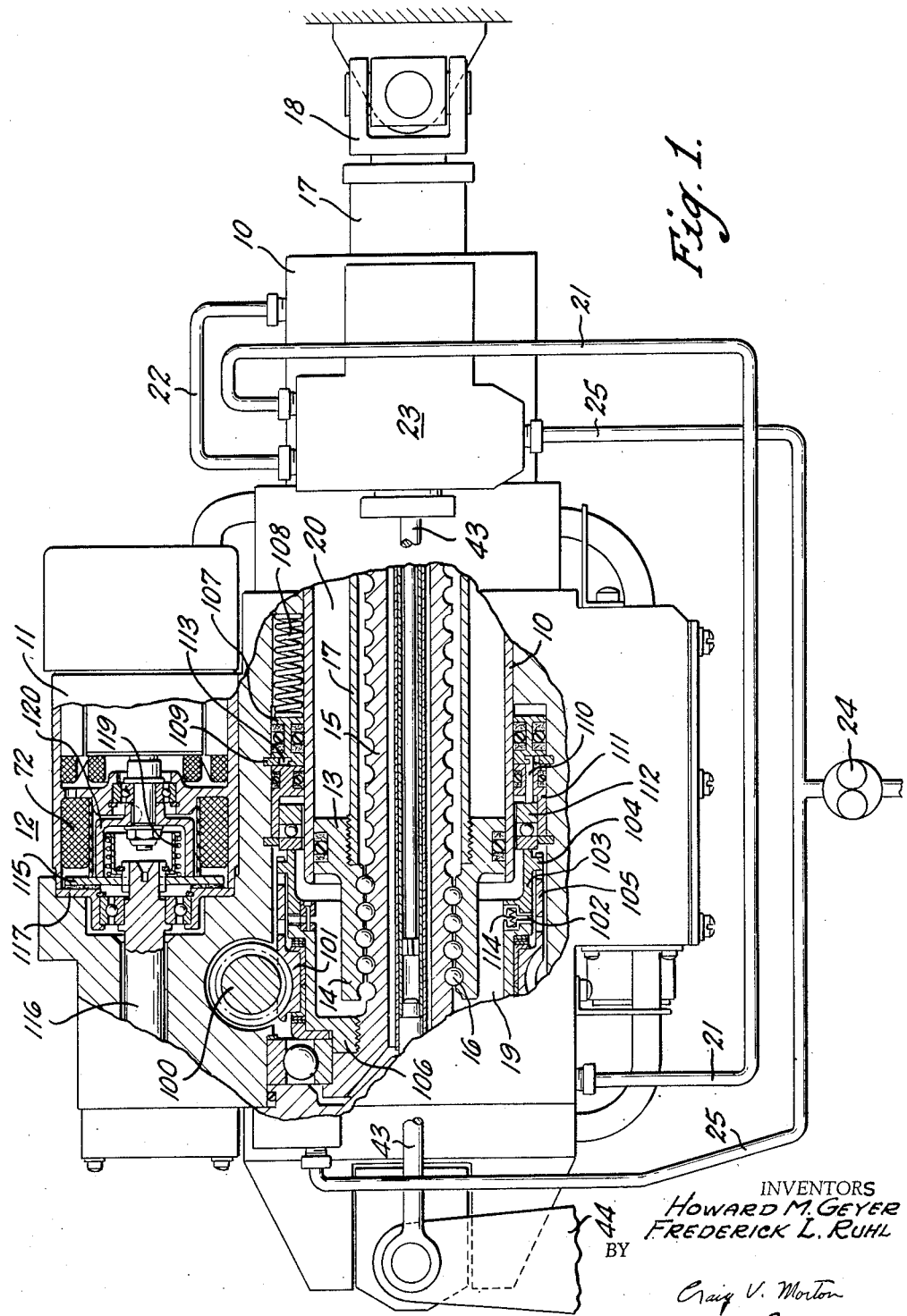

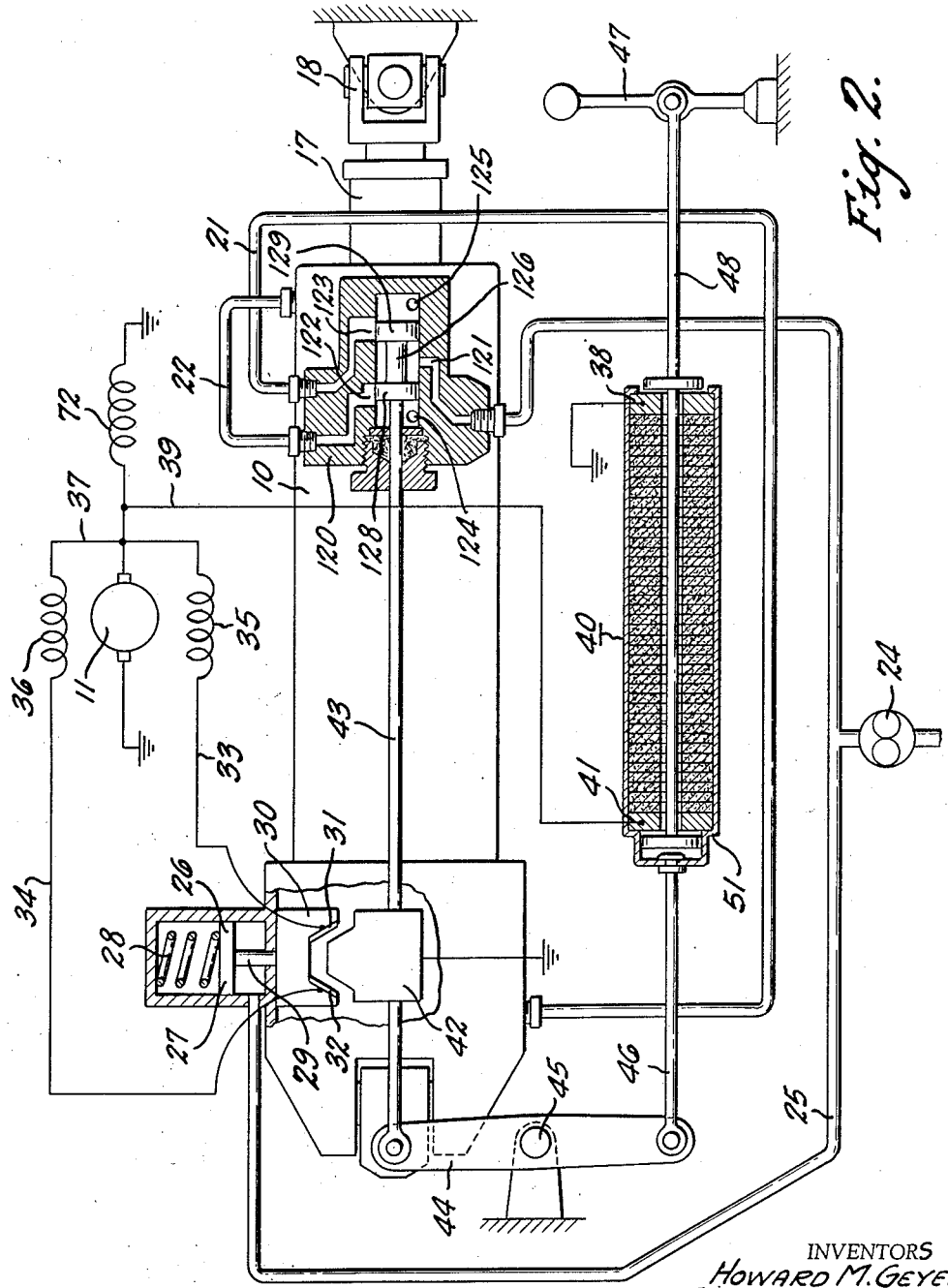

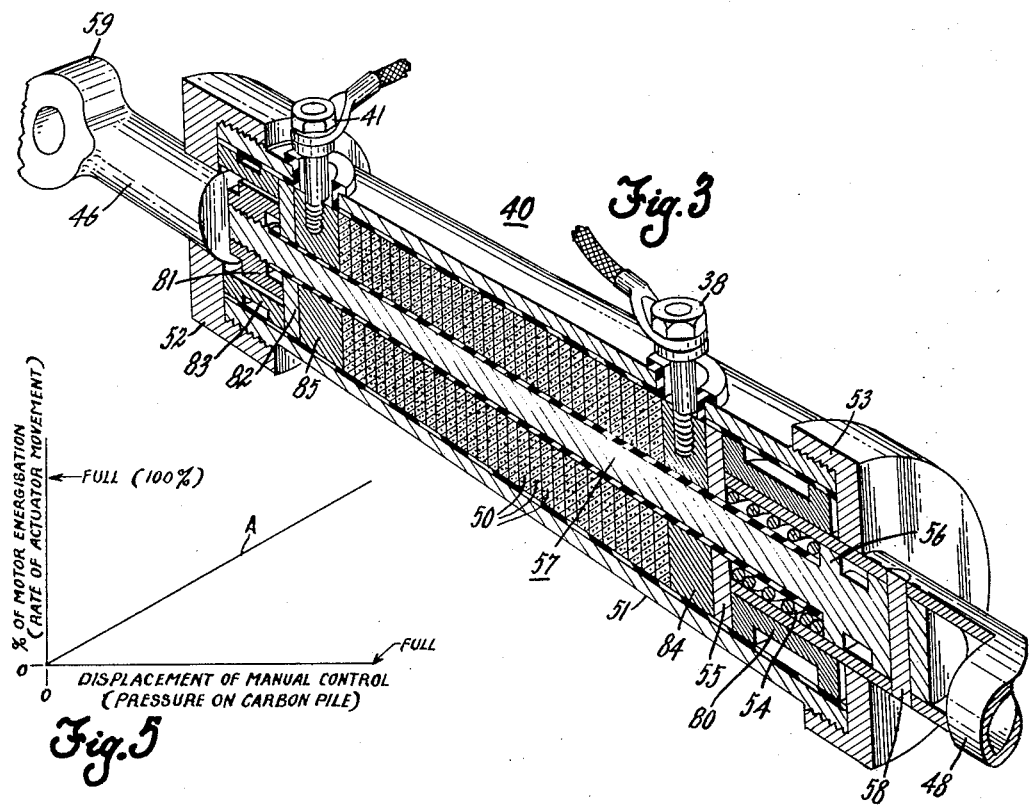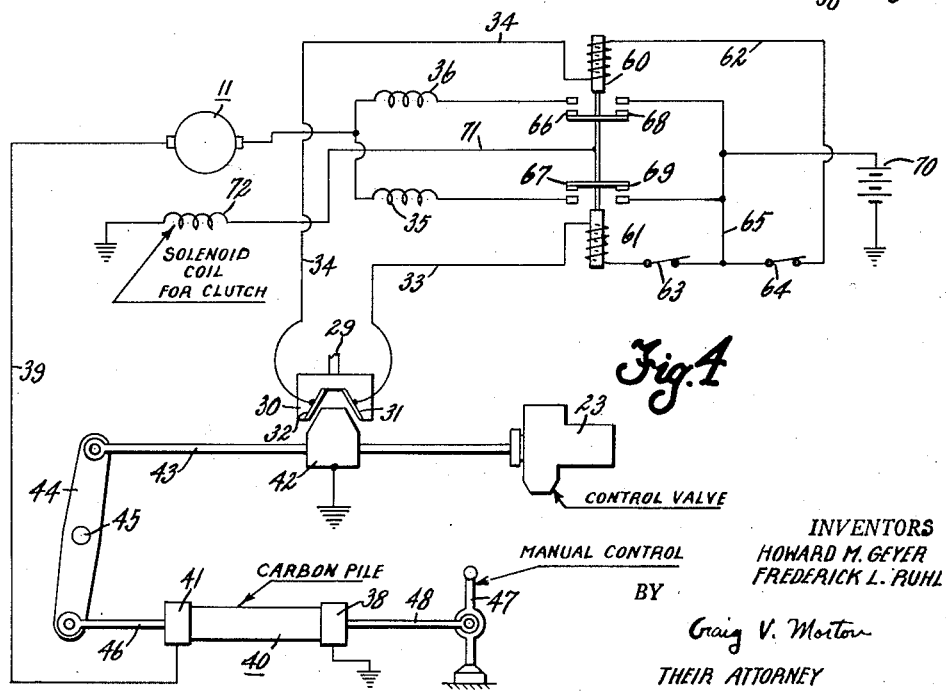

2,810,256

ACTUATOR WITH ELECTRIC MOTOR DRIVE AND MEANS FOR CONTROLLING THE DEGREE OF MOTOR ENERGIZATION

Howard M. Geyer, Dayton, and Frederick L. Ruhl, Covington, Ohio, assignors to General Motors Corporation, Detroit, Mich., a corporation of Delaware Application February 17, 1954, Serial No. 410,982

9 Claims. (Cl. 60—6)

This invention pertains to means for energizing an electromotive device, and particularly to a control system for an actuator driven by a reversible electric motor.

Heretofore, considerable difficulty has been encountered with the use of electric motor driven actuators, of either the electro-mechanical type, as shown in Patent No. 2,642,752, Geyer, issued June 23, 1953, or the dual drive type, as shown in Patent No. 2,620,683, Geyer, issued December 9, 1952. In an electric motor driven actuator of the rotary or linear type, precise movements cannot, at present, be controlled with the desired accuracy. This invention relates to means for proportionally energizing an electric motor so as to precisely control its movement, the energization of the electric motor being proportional to the displacement of a manual control member. Accordingly, among our objects are the provision of means for proportionally energizing an electric motor, the further provision of means for varying the degree of energization of an electric motor, and the still further provision of means for varying the rate of movement of an actuator driven by an electric motor, in proportion to the displacement of a manual control member.

The aforementioned and other objects are accomplished in the present invention by providing variable resistance means in the energizing circuit of an electric motor, the ohmic value of which is inversely proportional to the control force applied thereto. Specifically, the proportional energization means includes a carbon pile having electrical connection with the field windings of the electric motor, the resistance of the carbon pile being inversely proportional to the displacement of a manual control member.

The reversible electric motor disclosed herein is preferably of the split series type. The electric motor is operatively connected with an actuator through an electromagnetic clutch of the type shown in the aforementioned Patent 2,620,683. Accordingly, when the motor is deenergized, the driving connection between the actuator and the motor is interrupted, but when the motor is energized, the electromagnetic clutch is concurrently energized to establish the driving connection between the motor and the actuator.

The actuator may be of the type shown in either of the foregoing patents, and, thus, includes a rotatable member, or screw shaft, which may be drivingly connected through the electromagnetic clutch to the motor shaft. The rotatable screw shaft is disposed within a cylinder, and threadedly engages a non-rotatable member, or nut through the agency of a plurality of circulating balls. The nut is restrained against rotation, but is adapted to move axially relative to the screw shaft, upon relative rotation therebetween. The nut may be connected directly to a load device, or, as shown in the disclosed embodiment, the nut is connected to a reciprocable piston having a rod which projects through one end of the cylinder for attachment to the fixed support. Thus, upon rotation of the screw shaft, the nut and piston being restrained against all movement, the cylinder and screw shaft will move axially to position a load device, which is connected thereto.

The cylinder carries a pair of spaced, stationary contacts which are engageable by a rod carried contact for completing the circuit connections to the electric motor. The position of the rod carried contact may be adjusted by movement of a manual control member, which is operatively associated with the carbon pile. Accordingly, the degree of motor energization, and the rate of actuator movement is proportional to the displacement of the manual control member. Inasmuch as the cylinder moves relative to the piston, and the rod carried contact, the motor will be automatically deenergized when the force applied to the lever is discontinued.

Further objects and advantages of the present invention will be apparent from the following description, reference being had to the accompanying drawings wherein a preferred embodiment of the present invention is clearly shown and wherein similar reference characters denote similar parts throughout the several views.

In the drawings:

Fig. 1 is a fragmentary view, partly in elevation, and partly in section, of an actuator together with a schematic illustration of a fluid pressure control system therefor.

Fig. 2 is a view, partly in section and partly in elevation, of the actuator of Fig. 1 with part of the electrical control system and fluid pressure control system depicted schematically.

Fig. 3 is a fragmentary perspective view, partly in elevation and partly in section, of the carbon pile unit.

Fig. 4 is a circuit diagram of the electric control system of this invention.

Fig. 5 is a graph depicting the various degrees of motor energization.

With particular reference to Fig. 1, an actuator of the type shown in the aforementioned Patent 2,620,683 is depicted, which actuator comprises a cylinder 10 having attached thereto a reversible electric motor 11, which is operatively connected to a rotatable member thereof through a solenoid clutch 12, a shaft 116, a gear train including a worm gear 100 and a worm gear 101, and a dog toothed clutch 102. The actuator cylinder is connected to a movable load device, not shown. The cylinder 10 has disposed therein a reciprocal piston 13 capable of fluid pressure actuation in either direction relative to the cylinder. The piston 13 is integral with a hollow member 14 having a spiral groove of semi-circular cross section on its inner periphery. The member 14 is constrained for movement with the piston 13 and is restrained against rotation relative to the cylinder 10. The member 14 constitutes the nut of the well known ball-screw and nut coupling, and, accordingly, engages a rotatable member or screw shaft 15 through the agency of a plurality of circulating balls 16. The piston 13 includes a coaxially disposed rod portion 17, which projects through one end wall of the cylinder 10, and has attached thereto a clevis 18 by which it may be attached to a fixed support, as shown in Fig. 1.

The clutch 102 constitutes the releasable locking means for preventing rotation of the screw shaft 15 when the motor 11 is deenergized. The clutch 102 includes a driving member 103 which is rotatably connected by a projection 104 to a flange 105 of the worm gear 101. However, the member 103 is free to move axially relative to the flange 105 so as to disengage the clutch 102 and thereby release the locking means. The driven member of the clutch 102 is constituted by a cup-shaped member 106 which is secured to the shaft 15.

Ring piston 107 is slidably mounted on the cylinder

10. The piston is urged to the left as viewed in Figure 1 by a plurality of springs 108, and movement of the piston 107 to the left is limited by a stop ring 109. The piston 107 has a plurality of pins 110 attached thereto, these pins being slidably supported in a carrier 111. The pins 110 engage a thrust collar 112 which engages the clutch member 103. The piston 107 can be moved to the right as viewed in Figure 1 by the application of pressure fluid to space 113 between the carrier 111 and the piston 107. When the space 113 is pressurized the piston 107 moves to the right whereupon the thrust of spring 108 is removed from the clutch member 103 to permit springs 114 to disengage clutch member 103 from clutch member 106.

When the clutch members 103 and 106 are in engagement, rotation of the screw shaft 15 is prevented by worm gearing 100, 101 and disc 115 attached to the shaft 116 which is moved into engagement with a stationary brake disc 117 when winding 72 of the solenoid clutch is deenergized. The disc 115 is engaged by a spring 119 which is operable to move the disc 115 into engagement with the brake disc 117 when the winding 72 is deenergized. The solenoid clutch also includes a cup-shaped member 120, and when the winding 72 is energized, a magnetic field is established which attracts the magnetic disc 115, moving the disc 115 into engagement with the cup 120 which is rotated by the motor 11 whereupon the disc 115, the shaft 116 and the worm gearing 100, 101 will be rotated.

It will be appreciated that inasmuch as only relative linear movement between the piston and cylinder is necessary to achieve actuator movement, either the cylinder 10 or the piston 13 may be connected to the relatively movable load device, not shown. In the instant embodiment, the cylinder 10 is connected to the movable load device, and, accordingly, upon the application of pressure fluid to the cylinder on either side of the piston 13, the cylinder 10 will move lineally relative to the piston. The purpose of connecting the piston 13 to fixed supporting structure and permitting movement of the cylinder relative thereto will be more clearly set forth hereinafter.

The actuator depicted in Figs. 1 and 2 is of the dual drive type, as shown in the aforementioned Patent 2,620,683. That is, the piston 13 may be reciprocated relative to the cylinder 10 by either the application of pressure fluid to the cylinder, or by rotation of the screw shaft 15. Accordingly, the screw shaft 15 which is supported for rotation within the cylinder 10 is operatively connected through a gear train and the solenoid or electromagnetic clutch 12 to the electric motor 11.

As shown in Fig. 1, the piston 13 divides the cylinder 10 into an extend chamber 19 and a retract chamber 20, which chambers are connected by conduits 21 and 22 to a manual control valve 23. The valve 23 includes a casing 120 attached to the cylinder 10 having a pressure inlet port 121, a pair of control ports 122, 123, and a pair of drain ports 124, 125. A reciprocable plunger 126 having a pair of spaced control lands 128 and 129 cooperable with ports 122 and 123, respectively, is disposed within the valve casing 120 and connected with the rod 43. Inasmuch as the actuator disclosed in Patent No. 2,620,683 also includes locking means for restraining rotation of screw shaft 15 in the absence of fluid pressure application to the cylinder 10, it will be appreciated that some means must be provided concurrently releasing the locking means upon the application of fluid pressure to either actuator chamber. This may be accomplished by the means disclosed in Patent 2,620,683, and constitutes no part of this invention.

The fluid pressure control system is shown including a source of fluid pressure 24, which comprises a pump, having connection with the manual control valve 23 and with a conduit 25 which communicates with a servo chamber 26. The servo chamber 26 has disposed therein a reciprocable piston 27, which is biased to move downwardly, as viewed in Fig. 2, by means of a spring 28. The application of pressure fluid to the servo chamber 26 is operative to move the piston 27 upwardly to the position shown in Fig. 2. The piston 27 includes a rod portion 29, which projects through the servo cylinder housing and is attached to a contact carrying block 30 which carries a pair of spaced contacts 31 and 32. Contact 31 is connected by a wire 33 to one field winding 35 of the split series, direct current electric motor 11. Contact 32 is connected by a wire 34 to the other field winding 36 of the split series motor. The common terminals of the windings 35 and 36 are connected by a wire 37 to wire 39. The armature of the electric motor 11 is connected by wire 39 to terminal 41 of the carbon pile 40, while the other terminal 38 is connected to ground.

As long as the source of pressure 24 is above a predetermined pressure potential, pressure fluid in servo chamber 26 will maintain the contact block in the position of Fig. 2. However, if the pressure system should fail, or the pressure potential of pump 24 fall below the predetermined potential, the spring 28 will move the contact block 30 downwardly, where it may be engaged by a reciprocable rod carried contact 42. Accordingly, upon failure of the fluid pressure system, the servo mechanism is automatically rendered operative to establish an electrical circuit for energizing the motor 11 so that actuator movement may be effected by the electric motor in lieu of fluid pressure actuation. The contact 42 is carried by a rod 43, one end of which is pivotally connected to one end of a lever 44. The intermediate point of lever 44 is pivoted about a stationary point 45, and the other end of lever 44 is pivotally connected to a control rod 46. The rod 46 is connected with the casing 51 of the carbon pile which comprises stacked discs with aligned central openings through which a rod 48 extends. The rod 48 is operatively connected to a manual control lever 47 such that pivotal movement of lever 47 in either direction will compress the carbon pile 40 so as to vary the ohmic value thereof.

With particular reference to Fig. 3, a structural embodiment of the carbon pile 40 will be described. The carbon pile comprises carbon discs 50 having aligned central openings, which are mounted in a casing 51. The casing 51 is provided with end caps 52 and 53, and the carbon discs 50 are electrically connected to copper washers 84 and 85 which carry terminal members 38 and 41. As is well known to those skilled in the art, the ohmic value, or resistance of a carbon pile, is inversely proportional to the pressure applied to the carbon discs. The carbon discs 50 are initially preloaded by a coil spring 54, which is disposed within a chamber of the casing 51. One end of the spring 54 seats against a washer 55, which engages the washer 84. The other end of the spring 54 engages a shoulder 56 formed on a rod 57, which is coaxially disposed within casing 51 and extends through the aligned central openings in the carbon discs 50. The rod 48 engages washer 55 and is supported for reciprocable movement by a bearing 80. The rod 57 is connected by a cross pin 58 to the manual control rod 48 at one end, and is threadedly connected to a nut 81 at the other end. The nut engages a washer 82 and is supported for reciprocable movement by a bearing 83. Accordingly, the rod 57 constitutes an extension of manual control rod 48. The end cap member 52 has attached thereto to a rod 46 having an apertured end 59.

It will be appreciated that when the manual control rod 48 is moved longitudinally in either direction, pressure will be applied to the carbon discs 50 of the carbon pile through the washers 55 or 82, tending to compress the same and thereby reducing the ohmic value of the carbon pile. With reference to Fig. 5, it may be seen that the degree of motor energization may vary between zero and full energization by displacing member 47, as depicted by curve A. Specifically longitudinal movement of rod 48 to the left as viewed in Fig. 3 will compress the carbon pile by urging washer 55 to the left and pressing the discs 50 against the cap member 52 which transmits motion to rod 46. By moving rod 48 to the right, the washer 82 will urge the discs against cap member 53 and, thus, transmit movement to rod 46 through the casing 51.

With reference to Fig. 4, the circuit arrangement for energizing the split series motor 11 will be described. The carbon pile 40 is shown with terminal 38 connected to ground, and terminal 41 connected by wire 39 to one side of the motor armature. The carbon pile 40 is also shown having operative connection with control rods 46 and 48, the rod 46 being connected to lever or bell crank 44, and the rod 48 being connected to manual control lever 47. Lever 44 is also operatively connected to rod 43, which carries the contact 42. The rod 43 has operative connection with the manual control valve 23, heretofore described, so that fluid pressure actuation, as well as electrical actuation of the actuator may be effected by the lever 47. The contact 42 is shown connected to ground, and the cylinder carried contacts 31 and 32, carried by contact block 30, are shown connected by wires 33 and 34, respectively, to relay coils 60 and 61. Relay coil 60 is connected by a wire 62 through a normally closed limit switch 64 to a wire 65, which is connected to one terminal of a D. C. power supply 70. Relay winding 61 is connected through normally closed limit switch 63 to the wire 65 and, thence, to the power supply 70. Relay winding 61 is operative, when energized, to close relay contacts 67 and 69, and relay 60 is operative, when energized, to close relay contacts 66 and 68. The relay contacts 66, 68 and 67, 69 are maintained in the open position by opposed springs 120, 121 which act on an insulated lever 122 when both relays 60 and 61 are deenergized. The relay contacts 66 and 68, when closed, complete a circuit connection to energized field winding 36 and the armature, and contacts 67 and 69, when closed, are operative to complete a circuit for energizing field winding 35 and the armature. When either relay 60 or 61 is energized, a circuit is completed through wire 71 to energize the solenoid coil 72 for the solenoid, or electromagnetic clutch 12, aforedescribed.

In a split series type motor, when one field winding is energized, the motor will rotate in the counterclockwise direction, and when the other field is energized, the motor will rotate in the clockwise direction. Moreover, it should be appreciated that the speed of motor rotation, and, consequently, the rate of actuator movement is proportional to the degree of energization of the motor field windings. Accordingly, in the instant invention, the rate of actuator movement is proportional to the displacement of the manual control member 47, since the manual control member 47 controls the degree of energization of both field windings 35 and 36.

*Operation*

The actuator control system operates as follows. When the fluid pressure system is operative, the cylinder carried contact block 30 is moved to the position shown in Fig. 2, wherein movement of the control member 47 will not complete electrical connections to the motor 11. At this time, control valve 23 will be actuated by movement of the rod 43. Movement of the rod 43 and the reciprocable plunger 126 in one direction will connect the pressure supply port 121 with the extend port 123 while simultaneously connecting the retract port 128 to the drain port 124. Movement of the plunger 126 in the opposite direction will connect the retract port 128 with the pressure supply port 121 while the extend port 123 is connected to drain port 125. It is understood, of course, that concurrently with the introduction of fluid pressure into either one of the conduits 21 or 22, fluid pressure must be introduced into the space 113 to actuate the piston 107 thereby enabling the springs 114 to disengage the clutch member 103 from the clutch member 106. Since the casing 120 of the valve 23 is carried by the cylinder 10, fluid pressure actuation of the actuator operates in a follow-up manner with movement of the actuator being dependent upon the amount of movement of the manual control member 47.

It is pointed out that when the valve plunger 126 is in the neutral position as shown in Figure 2, both the extend and retract conduits 22 and 21 are connected to the drain ports 124 and 125, respectively, so as to permit the circulation of fluid from either side of the actuator piston 13 when the actuator piston is reciprocated by operation of electric motor 11. If the fluid pressure system should fail, the spring 108 will immediately move the piston 107 to the left to the position shown in Figure 1 so as to engage the clutch member 103 with the clutch member 106 and thereby prevent rotation of the screw shaft 15 and reciprocation of the piston 13 since the clutch member 103 is restrained against rotation by reason of the disc 115 engaging the brake disc 117 when the winding 72 is deenergized. At the same time, the spring 28 will move the contact block 30 downwardly, as viewed in Figure 2, so that the contacts 31 and 32 may be engaged by the contact 42 carried by the rod 43.

At this time, if the operator moves manual control member 47 in a clockwise direction, as viewed in Figs. 2 and 4, the lever 44 will be moved in a counterclockwise direction about pivot 45 so as to move rod 43 to the left, as viewed in Figs. 2 and 4. Accordingly, contact 32 will be engaged by contact 42, which is connected to ground, and at the same time, the carbon pile 40 will be compressed in proportion to the displacement of manual control member 47. Accordingly, the ohmic value of the carbon pile resistance will be determined by the force displacement of manual member 47, which will, in turn, control the degree of energization of field winding 36. After original displacement of the lever 47, the degree of motor energization is controlled by the degree of force applied and continuously maintained on the lever 47. In this manner, the speed of rotation of motor 11 and the rate of actuator movement is proportional to the displacement of the manual control member 47. Thus, the relay 60 will be energized, the solenoid clutch will be engaged by coil 72, and the field winding 36 and the armature of the electric motor will be energized so as to effect rotation of the screw shaft 15 and impart linear movement to the cylinder 10 to the left, as viewed in Fig. 2. As soon as the force is discontinued on the lever 47, the electrical circuit will be interrupted and the motor will be deenergized. Concurrently therewith, the solenoid 72 will be deenergized to again lock the screw shaft against rotation while the motor will coast to a standstill. In accordance with the teachings of the aforementioned Patent 2,620,683, the electric motor 11 is operative to drive the screw shaft 15 through the locking means in the locked condition.

Conversely, when the manual control lever 47 is moved in a counterclockwise direction, the lever 44 is moved in a clockwise direction about pivot 45 so as to move contact 42 into engagement with contact 31. In this manner, the direction of motor rotation is reversed inasmuch as field winding 35 is now energized. However, the speed of motor rotation and the rate of actuator movement is again proportional to the force displacement of the manual control member, since the manual control member directly controls the ohmic value of the carbon pile 40 to control the degree of energization of the electric motor 11.

From the foregoing, it is apparent that the present invention provides proportional control means for an electric motor. Moreover, the present invention provides control means for an electric motor driven actuator wherein the rate of actuator movement is proportional to the force displacement of a manual control member.

In addition, the present invention provides automatically operable means for interrupting energization of the motor when the displacement called for by the manual control member is achieved by the actuator.

While the embodiment of the present invention as herein disclosed, constitutes a preferred form, it is to be understood that other forms might be adopted.

What is claimed is as follows:

1. Control means for an electric motor driven actuator having an element connected to rotate with said motor and a member operatively connected with said element so as to move lineally in response to rotation thereof, including, a source of electric current, a carbon pile resistance unit having electrical connection with the motor and the source of electric current, and means operable to simultaneously energize said motor and vary the pressure applied to said carbon pile so as to control the degree of motor energization and the rate of travel of said actuator member, said last recited means including a switch having a part carried by said lineally movable member.

2. Control means for an electric motor driven actuator having an element connected to rotate with said motor and a member operatively connected with said element so as to move lineally in response to rotation thereof, including, a source of electric current, a carbon pile resistance unit having electrical connection with said motor and said source of current, a displaceable control lever for applying pressure to said carbon pile so as to vary the ohmic value thereof, and switch means including a part carried by said lineally movable member and another part operatively connected with said lever operable to energize said motor upon displacement of said control lever, whereby the degree of motor energization and the rate of travel of said actuator member are proportional to the displacement of said lever.

3. In combination with an actuator having a rotatable member operatively connected with a non-rotatable member such that upon relative rotation between said members, one of said members will move longitudinally relative to the other of said members, an electric motor operatively connected to said rotatable member for effecting rotation thereof so as to effect relative longitudinal movement between said members, a source of electric current for energizing said motor, a variable resistance unit having electrical connection with said source of electric current and said motor, and means including a switch having a part carried by said longitudinally movable member and a displaceable element for closing said switch and varying the ohmic value of said resistance unit so as to vary the degree of motor energization whereby the rate of relative longitudinal movement between said members is proportional to the displacement of said element.

4. In combination with an actuator having a rotatable member operatively connected with a non-rotatable member such that upon relative rotation between said members, one of said members will move longitudinally relative to the other of said members, an electric motor operatively connected to said rotatable member for effecting rotation thereof so as to effect relative longitudinal movement between said members, a source of electric current for energizing said motor, a carbon pile having electrical connections with said source of electric current and said motor, and manual control means for exerting pressure on said carbon pile so as to vary the ohmic value thereof and concurrently therewith complete a circuit connection between said source of current, said carbon pile and said electric motor so as to control the degree of energization of said electric motor, said circuit connection including a switch having parts carried by said longitudinally movable member and another part operatively connected to said manual control means.

5. The combination set forth in claim 4 wherein said manual control means includes a manually displaceable element for applying pressure to said carbon pile, and wherein said switch comprises a pair of contacts attached to and movable with said longitudinally movable member and a displaceable contact movable by said displaceable element, whereby the degree of motor energization and the rate of relative longitudinal movement between said members is proportional to the displacement of said element.

6. In combination with a dual drive actuator of the type including a cylinder having disposed therein a reciprocable piston capable of fluid pressure actuation in either direction relative to the cylinder, a member supported for rotation within said cylinder and operatively connected to said piston so as to rotate in response to relative movement between said cylinder and piston, and an electric motor operatively associated with said rotatable member for effecting rotation thereof and consequent reciprocation of said piston relative to said cylinder in lieu of fluid pressure actuation, a source of electric current for energizing said motor, a source of fluid pressure for effecting fluid pressure operation of said actuator, valve means having connection with said source of fluid pressure and said actuator cylinder for controlling the flow of pressure fluid therebetween, a circuit arrangement for interconnecting said source of electric current and said electric motor including switch means and means for varying the degree of motor energization, a manually displaceable element having operative connection with said valve means, said switch means and said means for varying the degree of motor energization, and means precluding energization of said electric motor while said fluid pressure system is operative.

7. The combination set forth in claim 6 wherein said last recited means comprises a servo actuated piston disposed in a servo cylinder, said servo cylinder being connected with said source of pressure fluid, said servo piston being operatively connected with said switch means, the construction and arrangement being such that said switch means is rendered inoperative by said piston when the pressure potential of fluid in said servo chamber is above a predetermined potential indicative of the fact that the fluid pressure system is operative.

8. The combination set forth in claim 6 wherein the means for varying the degree of motor energization comprises a variable resistance unit, the ohmic value of which is inversely proportional to the force displacement of said displaceable element.

9. The combination set forth in claim 8 wherein said variable resistance unit comprises a carbon pile, and wherein said displaceable element is operable to apply pressure to said carbon pile in proportion to its force displacement, whereby the degree of motor energization and the rate of rotation of said rotatable member is proportional to the force displacement of said element.

References Cited in the file of this patent

UNITED STATES PATENTS

| | | |
|---|---|---|
| 2,476,376 | Laraque | July 19, 1949 |
| 2,522,284 | Lecarme | Sept. 12, 1950 |
| 2,620,683 | Geyer | Dec. 9, 1952 |
| 2,638,736 | Feeney et al. | May 19, 1953 |